United States Patent
Breault et al.

[11] Patent Number: 6,020,083
[45] Date of Patent: Feb. 1, 2000

[54] MEMBRANE ELECTRODE ASSEMBLY FOR PEM FUEL CELL

[75] Inventors: Richard D. Breault, No. Kingstown, R.I.; Myron Krasij, Avon, Conn.

[73] Assignee: International Fuel Cells LLC, South Windsor, Conn.

[21] Appl. No.: 09/182,959

[22] Filed: Oct. 30, 1998

[51] Int. Cl.$^7$ .................................................. H01M 2/08
[52] U.S. Cl. .......................... 429/36; 429/35; 429/38; 429/39; 429/41; 429/44; 429/30; 429/33
[58] Field of Search .................. 429/35, 36, 38, 429/39, 30, 33, 41, 44

[56] References Cited

U.S. PATENT DOCUMENTS

| | | | |
|---|---|---|---|
| 3,867,206 | 2/1975 | Trocciola et al. | 136/86 D |
| 4,279,970 | 7/1981 | Breault et al. | 429/35 |
| 4,729,932 | 3/1988 | McElroy | 429/34 |
| 4,756,981 | 7/1988 | Breault et al. | 429/36 |
| 4,769,297 | 9/1988 | Reiser et al. | 429/17 |
| 4,855,194 | 8/1989 | Wright | 429/38 |
| 4,913,706 | 4/1990 | Luoma et al. | 429/35 |
| 5,096,786 | 3/1992 | Granata, Jr. et al. | 429/36 |
| 5,176,966 | 1/1993 | Epp et al. | 429/26 |
| 5,176,996 | 1/1993 | Hogan et al. | 435/6 |
| 5,264,299 | 11/1993 | Krasij et al. | 429/30 |
| 5,300,124 | 4/1994 | Breault et al. | 29/623.3 |
| 5,360,679 | 11/1994 | Buswell et al. | 429/19 |
| 5,366,825 | 11/1994 | Breault et al. | 429/34 |
| 5,464,700 | 11/1995 | Steck et al. | 429/30 |
| 5,503,944 | 4/1996 | Meyer et al. | 429/13 |
| 5,523,175 | 6/1996 | Beal et al. | 429/30 |
| 5,700,595 | 12/1997 | Reiser | 429/13 |
| 5,736,269 | 4/1998 | Okamoto et al. | 429/38 |
| 5,912,088 | 6/1999 | Ernst | 429/38 |

FOREIGN PATENT DOCUMENTS 389020  10/1989  Australia .

*Primary Examiner*—Bruce F. Bell
*Attorney, Agent, or Firm*—Barlow,Josephs Holmes, Ltd.

[57] ABSTRACT

An improved membrane electrode assembly for PEM fuel cells is provided. Catalyst layers (40, 44) are disposed, respectively, on both sides of the full planform proton exchange membrane (48). Gas diffusion layers (38, 50) are disposed, respectively, on sides of the catalyst layers (40, 44) not in communication with the full planform proton exchange membrane (48). Porous substrates (32, 34) are disposed, respectively, on sides of the gas diffusion layers (38, 50) not in communication with the catalyst layers (40, 44). The porous substrates (32, 34) are impregnated at their periphery with a sealant. The gas diffusion layers (38, 50) are coated with a sealant (60, 62) on respective sides thereof in regions which are in communication with sealant impregnated regions (36, 52) of the porous substrates (32, 34). The gas diffusion layers (38, 50), the porous substrates (32, 34), and the catalyst layers (40, 44) are co-extensive with the proton exchange membrane (48). The membrane electrode assembly (10) is continuously manufactured to eliminate step discontinuities and the associated strict tolerance requirements and resultant high scrap rates.

14 Claims, 2 Drawing Sheets

6,020,083

MEMBRANE ELECTRODE ASSEMBLY FOR PEM FUEL CELL

TECHNICAL FIELD

The present invention relates to proton exchange membrane fuel cells and membrane electrode assemblies for fuel cells. More specifically, the present invention relates to improved construction of fuel cells to simplify and reduce of the cost of production of such cells.

BACKGROUND ART

Solid polymer electrolyte fuel cell power plants are known in the prior art, and prototypes are even available from commercial sources, such as Ballard power Systems, Inc. of Vancouver, Canada. These systems are serviceable, but are relatively complex. An example of a Ballard power Systems polymer membrane power plant is shown in U.S. Pat. No. 5,360,679, granted Nov. 1, 1994.

In addition, known fuel cell constructions commonly include a proton exchange membrane disposed between respective cathode and anode plates. The general principles of construction and operation of such fuel cells are so well known that they need not be discussed here in great detail. In general, the operation of a proton exchange membrane (PEM) fuel cell includes the supply of gaseous fuel and an oxidizing gas to the anode electrode plate and cathode electrode plate, respectively, and distributed as uniformly as possible over the active surfaces of the respective electrode plates, or, more specifically, the electrode plate surfaces facing the proton exchange membrane, each of which typically includes a catalyst layer therebetween. An electrochemical reaction takes place at and between the anode plate and cathode plate, with attendant formation of a product of the reaction between the fuel and oxygen, release of thermal energy, creation of an electrical potential difference between the electrode plates, and travel of electric charge carriers between the electrode plates, with the thus generated electric power usually constituting the useful output of the fuel cell.

One problem occurring in solid polymer fuel cells relates to the management of water, both coolant and product water, within the cells in the power plant. In a solid polymer membrane fuel cell power plant, product water is formed by an electrochemical reaction on the cathode side of the cells, specifically by the combination of hydrogen ions, electrons and oxygen molecules. The product water must be drawn away from the cathode side of the cells, and makeup water must be provided to the anode side of the cells in amounts which will prevent dryout of the proton exchange membrane, while avoiding flooding, of the cathode side of the electrode plate.

Austrian Patent No. 389,020 describes a hydrogen ion-exchange membrane fuel cell stack which utilizes a fine pore water coolant plate assemblage to provide a passive coolant and water management control. The Austrian system utilizes a water-saturated fine pore plate assemblage between the cathode side of one cell and the anode side of the adjacent cell to both cool the cells and to prevent reactant crossover between adjacent cells. The fine pore plate assemblage is also used to move product water away from the cathode side of the ion-exchange membrane and into the coolant water stream; and to move coolant water toward the anode side of the ion-exchange membrane to prevent anode dryout. The preferred directional movement of the product and coolant water is accomplished by forming the water coolant plate assemblage in two parts, one part having a pore size which will ensure that product water formed on the cathode side will be wicked into the fine pore plate and moved by capillarity toward the water coolant passage network which is inside of the coolant plate assemblage. The coolant plate assemblage also includes a second plate which has a finer pore structure than the first plate, and which is operable to wick water out of the water coolant passages and move that water toward the anode by capillarity. The fine pore and finer pore plates in each assemblage are grooved to form the coolant passage network and reactant passage network, and are disposed in face-to-face alignment between adjacent cells. The finer pore plate is thinner than the fine pore plate so as to position the water coolant passages in closer proximity with the anodes than with the cathodes. The aforesaid solution to water management and cell cooling in ion-exchange membrane fuel cell power plants is difficult to achieve due to the quality control requirements of the fine and finer pore plates, and is also expensive because the plate components are not uniformly produced.

In the fuel cell technology, the water transport plate is a porous structure filled with water. During fuel cell operation, the water transport plate supplies water locally to maintain humidification of a proton exchange membrane (PEM), removes product water formed at the cathode, removes by-product heat via a circulating coolant water stream, conducts electricity from cell to cell, provides a gas separator between adjacent cells and provides passages for conducting the reactants through the cell. The water transport plate supplies water to the fuel cell to replenish water which has been lost by evaporation therefrom. This system and operation thereof is described in U.S. Pat. No. 5,303,944 by Meyer, U.S. Pat. No. 5,700,595 by Reiser and U.S. Pat. No. 4,769,297 by Reiser, each incorporated herein by reference.

For a fuel cell to be economically feasible, it must not only have a superior design and have the desired performance but it must also be capable of being mass produced. The mass production of fuel cell components raises several issues which are of great concern. The cost of production must be kept as low as possible without sacrificing quality and efficiency of the cell. As fuel cell components become more complex and more components are needed in a given fuel cell, the cost of that cell increases significantly.

Fuel cell components, such as bi-layers, catalyst layers, substrates, and water transport plates are becoming increasingly complex requiring precision dimensioning. In particular, prior art fuel cell components commonly employ edge gaskets which, in combination with the components above, require close tolerances in the manufacturing process to avoid the component being scrapped and to provide an effective seal. The requirement of maintaining close tolerances are necessitated due to the inherent step discontinuities associated with the employment of edge gaskets within known fuel cell assemblies.

Further, a major concern with PEM fuel cells is reactant distribution and containment within the cell. This is of particular concern when employing porous members such as electrode substrates. This porosity is needed to supply to and substantially uniformly distribute over the respective active surface the respective gaseous medium which is fed through respective channels provided in the anode water transport plate and the cathode water transport plate to the areas of the respective electrode plate that are catalytically active and spaced from the proton exchange membrane. Also, these porous structures are used to remove the reaction water from one of the active surfaces and supply of water to the other active surfaces to avoid drying out of the proton exchange membrane.

When porous water transport plates and porous electrode substrates are employed in a PEM fuel cell, it is necessary to ensure that neither any liquid, such as product or coolant water in a PEM fuel cell, nor any gaseous media such as the fuel or oxidant, be able to flow in or out of the periphery or edge of the respective porous water transport plate or electrode substrate. The escape of reactant gases through the periphery or edge of the water transport plates or electrode substrate results in the loss of the respective media causing a decrease in fuel cell efficiency. Most importantly, preventing the escape of media through the periphery or edge of the water transport plate or electrode substrate is critical to avoid the mixture of gaseous fuel with the oxidizing gas or ambient air which could be catastrophic. Therefore, manufacturing tolerances must be kept to a minimum and step discontinuities must be eliminated to ensure effective sealing to realize proper fuel cell operation. Also, to avoid component corrosion, oxygen must be prevented from reaching the cathode catalyst in its corresponding seal area and the associated high potentials on the cathode side of the fuel cell.

Various attempts have been made in the prior art to provide a seal design for a PEM fuel cell to minimize the effect of poor manufacturing tolerances and step discontinuities. One such attempt is described in U.S. Pat. No. 5,176,966 by Epp et al., incorporated herein by reference. For example, this patent discloses a solid polymer ion exchange membrane disposed between two carbon fiber paper support layers. Interdisposed between the support layers and the exchange membrane are catalyst layers. The support layers support substantially the entire surface of the exchange membrane. However, this construction is susceptible to corrosion due to the poor peripheral sealing to prevent oxygen from reaching the cathode catalyst. For example, U.S. Pat. No. 5,264,299, incorporated herein by reference, also teaches such a construction.

In view of the foregoing, an improved fuel cell is desired which is inexpensive and capable of mass production. It is also desirable for a PEM fuel cell to include a membrane electrode assembly which eliminates stepped configurations to avoid step discontinuities. An improved fuel cell is desired where the membrane electrode assembly can be continuously and mass produced with manufacturing tolerances being easier to maintain.

DISCLOSURE OF THE INVENTION

The present invention preserves the advantages of prior art proton exchange membrane for fuel cells. In addition, it provides new advantages not found in currently available fuel cells, and overcomes many disadvantages of such currently available fuel cells.

This invention is generally directed to a novel fuel cell with an improved membrane electrode assembly (MEA) construction. The improved MEA consists of a proton exchange membrane whose surfaces are coated with catalyst over the whole planform of the cell. Adjacent to both catalyst layers are so-called gas diffusion bi-layers which are well known in the art. The bi-layers are supported onto porous graphite substrates which are also well known in the art. Both the bi-layers and the substrates are co-extensive to one another and also co-extensive with the proton exchange membrane and the catalyst layer. The periphery of the substrates are impregnated with an elastomer to create a reactant seal and the exposed surface of the bi-layers are coated, at the periphery opposed to the impregnated area of the substrate, with an elastomer to prevent reactant penetration to the catalyst and thus prevent corrosion.

The membrane electrode assembly of the present invention is manufactured in continuous fashion to avoid the problems associated with prior art membrane electrode assemblies. For example, the assembly of the present invention eliminates a number of elements of known membrane electrode assemblies, such as separate edge seals and gaskets. The continuous manufacture of the proton exchange membrane, catalyst layers and bi-layers, where each such layers are co-extensive to one another, greatly simplifies the manufacturing process to eliminate step discontinuities and strict tolerance requirements which are associated with assemblies which have the edge seals and gaskets as described above. In accordance with the present invention, strict tolerance requirements during the manufacture of membrane electrode assemblies are avoided resulting in scrap rates much lower than can be realized during the manufacture of prior art assemblies.

It is therefore an object of the present invention to provide a PEM fuel cell assembly which includes a membrane electrode assembly which has good sealing characteristics and is inexpensive to manufacture.

It is also an object of the present invention to provide a PEM fuel cell assembly which includes a membrane electrode assembly which may be continuously manufactured.

It is further an object of the present invention to provide a PEM fuel cell assembly which includes a membrane electrode assembly where manufacturing tolerances in production are easier to maintain.

It is further an object of the present invention to provide a PEM fuel cell assembly which includes a membrane electrode assembly which eliminates step discontinuities.

It is also an object of the present invention to provide a PEM fuel cell assembly which includes a membrane electrode assembly which generates realizes low scrap rates in production.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

MODES FOR CARRYING OUT THE INVENTION

Figure 1:
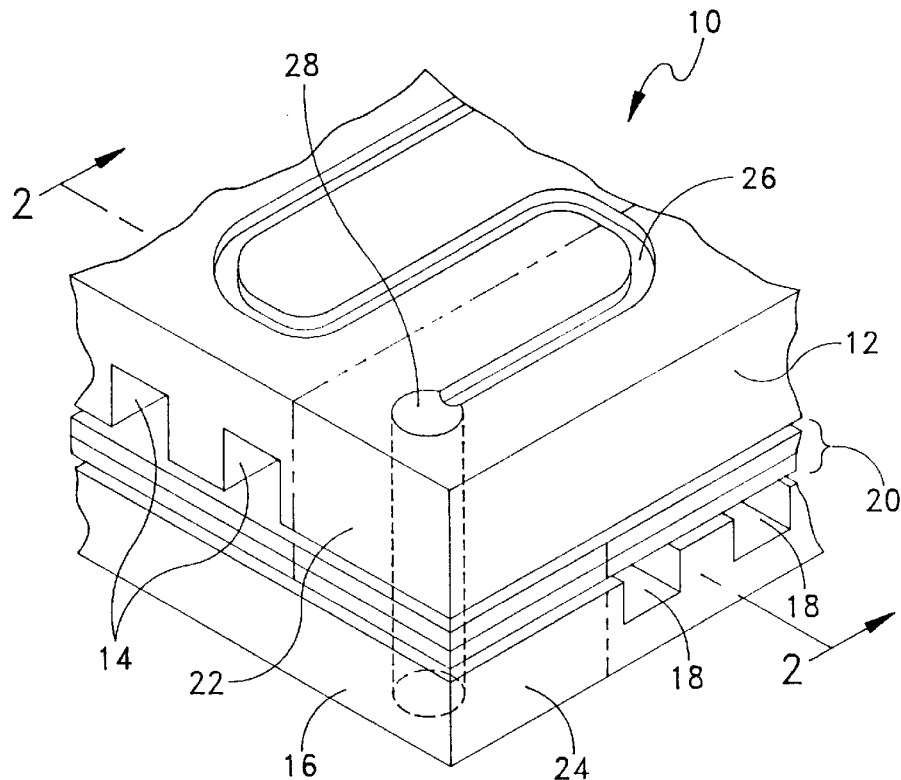
FIG. 1 is a perspective view of the PEM fuel cell with the improved edge seal design of the present invention.
Figure 2:
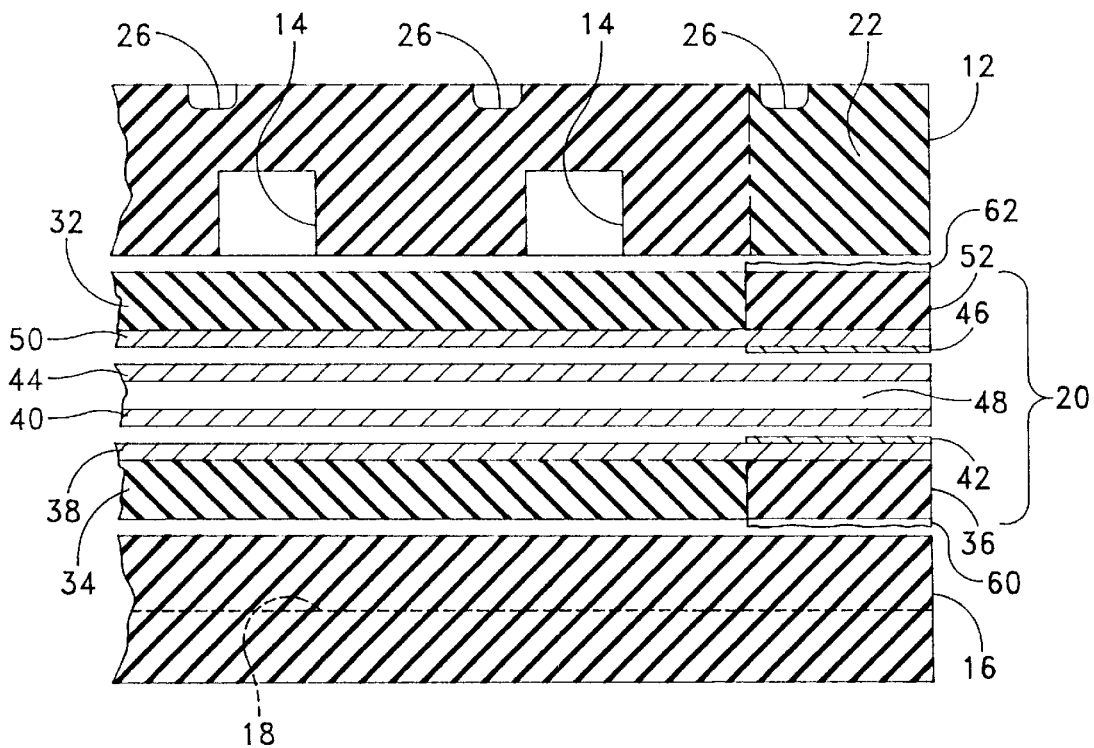
FIG. 2 is a cross-sectional view through the line 2—2 of FIG. 1.

Referring to both FIGS. 1 and 2, a proton exchange membrane (PEM) fuel cell 10 is shown to include a cathode water transport plate 12 and anode water transport plate 16 which may be made in accordance with various method of manufacturing known in the art. The cathode water transport plate 12 includes cathode air flow channels 14 while anode water transport plate 16 includes anode fuel flow channels 18. Cathode water transport plate 12 includes coolant flow channel 26.

In connection with the improved water transport plates 12 and 16 discussed above, the PEM fuel cell of the present invention provides an improved edge seal design which employs a wet edge seal 22 in the water transport plate to prevent reactant gas intrusion into the water system and vice versa, and employs the same wet edge seal to prevent coolant and product water from escaping. Water transport plates 12 and 16 are preferably formed of graphite powder, cellulosic fibers, and reinforcing fibers all bonded together with a thermosetting resin and heat treated to convert the organic materials to carbon.

Alternatively, the improved membrane electrode assembly provided by this invention may be used with non-porous reactant flow field plates in place of the preferred combined water transport plate/reactant flow field.

Disposed between cathode water transport plate 12 and anode water transport plate 16 is a membrane electrode assembly (MEA), generally referenced as 20. Within the membrane electrode assembly 20, a cathode substrate 32 with a cathode bi-layer (cathode gas diffusion layer) 50 thereon and elastomer impregnated substrate seal 52 is provided. Cathode bi-layer 50 is substantially co-extensive with cathode substrate 32. Also provided is anode substrate 34 with an anode bi-layer (anode gas diffusion layer) 38 thereon and elastomer impregnated substrate seal 36. Anode bi-layer 38 is substantially co-extensive with anode substrate 34. In the seal impregnating process, cathode side seal build-up 62 and anode side seal build-up 60 are left remaining to serve as an interfacial seal between substrates 32 and 34 and respective corresponding water transport plates 12 and 16.

Anode catalyst 40 and cathode catalyst 44 are provided with proton exchange membrane 48 sandwiched therebetween. Catalyst layers 40 and 44 are preferably co-extensive with proton exchange membrane 48 and may be platinum or other suitable catalyst material. Alternatively, catalyst layers 40 and 44 may be smaller in planform than membrane 48. Anode bi-layer surface seal 42 is provided on anode bi-layer 38 while cathode bi-layer surface seal 46 is provided on cathode bi-layer 50.

Figure 3:
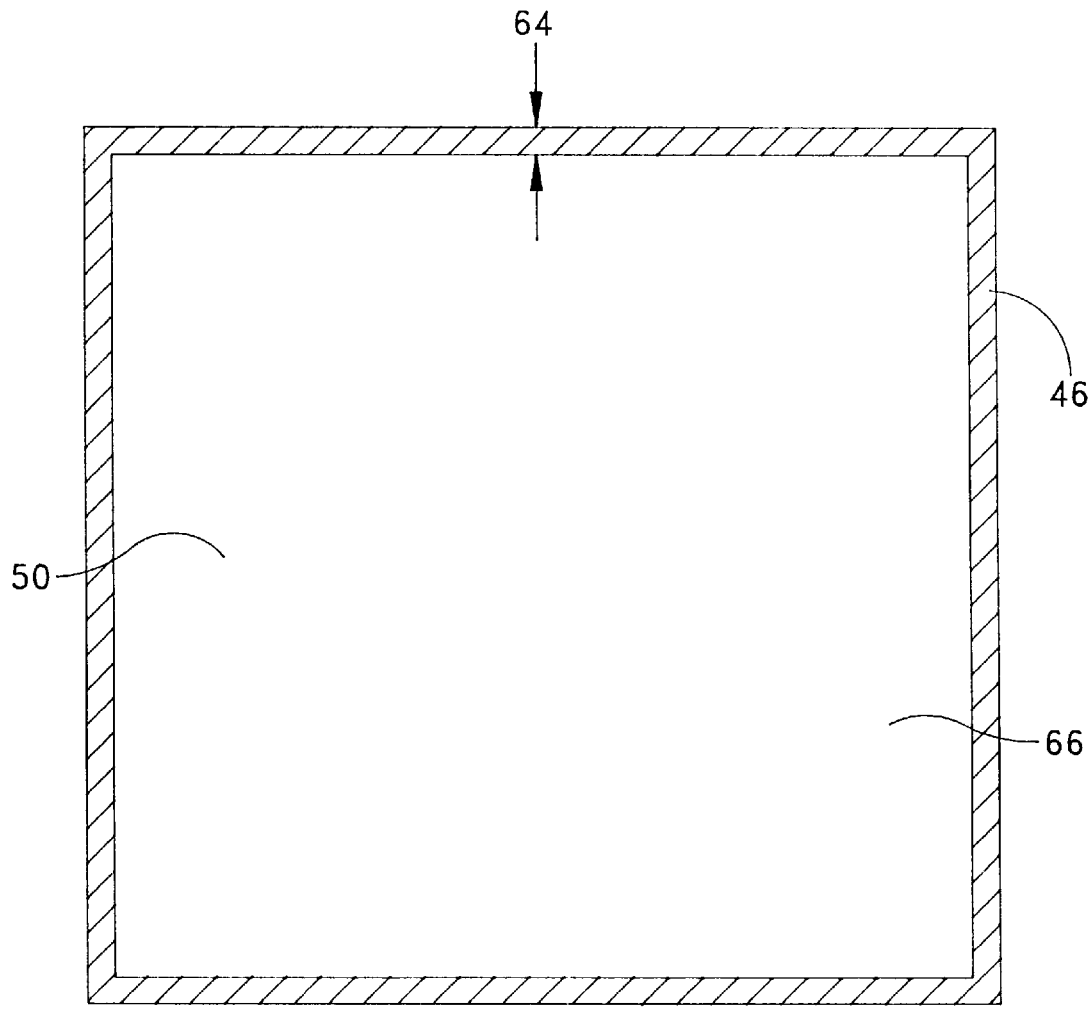
FIG. 3 is plan view of a bi-layer of the present invention with peripheral coating of sealing material thereon.

FIG. 3 illustrates a plan view (planform) of the cathode bi-layer surface seal 46 on cathode bi-layer 50 where seal 46 is preferably disposed about the entire peripheral edge portion 64 of cathode bi-layer 50. Central portion 66 is devoid of seal 46. The plan view of the anode bi-layer surface seal 42 is not shown for convenience but is identical to cathode bi-layer surface seal 46 in an inverted position. The layouts of surface seals 42 and 46 are configured to prevent oxygen from reaching cathode catalyst 44 which cause high potentials on the cathode side of fuel cell 10 and result in unwanted corrosion. This is accomplished by applying surface seals 42 and 46 by well known methods such as by screen printing an elastomer sealant material, such as FLUOROLAST grade SB or WB manufactured by Fluorolast, a Laureen Division, with an inert filler such as silicon carbide on bi-layers 38 and 50, respectively. Alternatively, SYLGARD, manufactured by Dow Chemical Corporation, may be employed as the elastomeric sealant material. Still further, a combination of FLUOROLAST and SYLGARD may be employed in accordance with the present invention. Alternatively, the inert filler may be eliminated.

In particular, anode bi-layer 38 and cathode bi-layer 50 do not contain an edge seal in accordance with the present invention. The pore size of bi-layers 38 and 50 are selected to be very small with very small cross-sectional area so as to minimize in-plane gas permeability to ensure low reactant leakage even without the presence of a polymer impregnated edge seal. Bi-layers 38 and 50 are preferably carbon black and of a small thickness to further reduce reactant leakage.

In the manufacturing process, cathode substrate 32 and anode substrate 34 are porous carbon paper, grade TGP-006, obtained from Toray Marketing & Sales, Inc., Encino, Calif. These substrates are selectively wetproofed with a fluoropolymer such as grade FEP-120 Teflon obtained from the E.I. Dupont Co. of Wilmington, Del. to a fluoropolymer concentration of 10 to 20 weight percent. The substrate is selectively wetproofed such that the central area 66 is wetproofed and the peripheral seal area 46 is not wetproofed. The wetproofing can be applied by methods well known in the art such as screen printing. Bi-layers 50 and 38 are, respectively, applied to substrates 32 and 34. The so-called gas diffusion bi-layers are typically formed from a high structure carbon black, such as Vulcan XC-72 made by the Cabot Co. of Billrecia, Mass., and 35–65 weight percent fluoropolymer such as the FEP-120 previously referenced or grade TFE-30 or equivalent. The bi-layer is applied by methods well known in the art such as commonly owned U.S. Pat. No. 4,233,181. The bi-layers are typically 0.002 inches to 0.005 inches thick.

Manufacture of the MEA, namely the bi-layer and fine pore layer components of the present invention will be further clarified with reference to the following illustrative example. This example is meant to illustrate the process of forming the bi-layer and fine pore layers of the MEA in accordance with the present invention. Component tests were performed to establish the sealing characteristics of the improved cell. It is not, however, meant to limit the scope thereof.

EXAMPLE

A porous graphite electrode substrate, grade TGP-006 about 0.007 inches thick, obtained from Toray was coated with a gas diffusion bi-layer consisting of Vulcan XC-72 and 50 weight percent Teflon FEP-120 by the general method described in U.S. Pat. No. 4,233,181. The thickness of the bi-layer was about 0.004 inches. The bi-layer was heated to about 660° F. for 15 minutes. A ¼-inch by ⅜-inch wide band around the edges of a 3-inch by 3-inch sample of the bi-layer/substrate combination was coated with Fluorolast grade WB using a brush to impregnate the void volume of the substrate and to coat the surface of the bi-layer. The sample was air dried and then oven dried at 66° C. for 30 minutes. The Fluorolast treated bi-layer/substrate combination was bonded to a 3-inch by 3-inch by 0.072-inch porous graphite water transport plate made by International Fuel Cells which has a mean pore size of about 2.5 microns and is about 35 percent porous. The bonding conditions were a temperature of about 350° F. at a load of about 800 pounds for ten minutes. A 0.25 inch diameter hole was cut in the center of the bonded assembly. The bonded assembly was vacuum filled with water in preparation for a leakage test. The water filled assembly was mounted in a pressure test fixture and leakage was measured using a nitrogen gas. Leakage was observed at a pressure of 1.0 psig to be 0.2 cm$^3$ per linear inch of seal which meets the requirements.

There are numerous advantages realized by the PEM fuel cell of the present invention. The ability to manufacture the membrane electrode assembly, including the PEM, in a continuous fashion greatly facilitates mass production and the avoidance of costly high scrap rates. The elimination of step discontinuities in the PEM cell construction obviates the need for close tolerances in the cell construction which, in turn, reduces the overall cost of the manufacture of the PEM cell components discussed herein.

It would be appreciated by those skilled in the art that various changes and modifications can be made to the illustrated embodiments without departing from the spirit of the present invention. All such modifications and changes are intended to be covered by the appended claims.

What is claimed is:

1. A membrane electrode assembly, comprising:
   a full planform proton exchange membrane having a central area on both sides thereof;
   catalyst layers disposed, respectively, on both sides of said full planform proton exchange membrane in a region over said central area;
   gas diffusion layers disposed, respectively, on sides of said catalyst layers not in communication with said full planform proton exchange membrane;
   porous substrates disposed, respectively, on sides of said gas diffusion layers not in communication with said catalyst layers; each of said porous substrates being impregnated at their periphery with a sealant; and
   said gas diffusion layers being coated with a sealant on respective sides thereof in regions which are in communication with sealant impregnated regions of said porous substrates; said gas diffusion layers and said porous substrates being co-extensive with said proton exchange membrane.

2. The proton exchange membrane fuel cell component of claim 1, wherein said sealant material is an elastomer.

3. The proton exchange membrane fuel cell component of claim 2, wherein said elastomer is florocarbon elastomeric based.

4. The proton exchange membrane fuel cell component of claim 2, wherein said elastomer is silicone based.

5. The proton exchange membrane fuel cell of claim 2, wherein said elastomer is a combination of a fluorocarbon elastomeric based and a silicone based materials.

6. The proton exchange membrane fuel cell component of claim 1, wherein said full planform proton exchange membrane, said catalyst layers, said gas diffusion layers and said porous substrates are bonded together to form a membrane electrode assembly.

7. The proton exchange membrane fuel cell component of claim 1, wherein:
   each of said porous substrates including a central portion and a peripheral portion; said peripheral portion being integral with and circumferentially completely surrounding said central portion.

8. A membrane electrode assembly, comprising:
   a full planform proton exchange membrane having a central area on both sides thereof;
   catalyst layers disposed, respectively, on both sides of said full planform proton exchange membrane;
   gas diffusion layers disposed, respectively, on sides of said catalyst layers not in communication with said full planform proton exchange membrane;
   porous substrates disposed, respectively, on sides of said gas diffusion layers not in communication with said catalyst layers; each of said porous substrates being impregnated at their periphery with a sealant; and
   said gas diffusion layers being coated with a sealant on respective sides thereof in regions which are in communication with sealant impregnated regions of said porous substrates; said gas diffusion layers, said porous substrates and said catalyst layers being co-extensive with said proton exchange membrane.

9. The proton exchange membrane fuel cell component of claim 8, wherein said sealant material is an elastomer.

10. The proton exchange membrane fuel cell component of claim 9, wherein said elastomer is fluorocarbon elastomeric based.

11. The proton exchange membrane fuel cell component of claim 9, wherein said elastomer is silicone based.

12. The proton exchange membrane fuel cell component of claim 9, wherein said elastomer is a combination of a fluorocarbon elastomeric based and a silicone based materials.

13. The proton exchange membrane fuel cell component of claim 8, wherein said full planform proton exchange membrane, said catalyst layers, said gas diffusion layers and said porous substrates are bonded together to form a membrane electrode assembly.

14. The proton exchange membrane fuel cell component of claim 8, wherein:
   each of said porous substrates including a central portion and a peripheral portion; said peripheral portion being integral with and circumferentially completely surrounding said central portion.

* * * * *